(12) United States Patent
Bucsan et al.

(10) Patent No.: US 12,489,181 B2
(45) Date of Patent: *Dec. 2, 2025

(54) SYSTEM AND METHOD FOR A BATTERY SAFETY DEVICE

(71) Applicant: Electra.aero, Inc., Manassas, VA (US)

(72) Inventors: George Bucsan, McLean, VA (US); Tim Moser, Trimbach (CH)

(73) Assignee: Electra.aero, Inc., Manassas, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/624,613

(22) Filed: Apr. 2, 2024

(65) Prior Publication Data
US 2024/0266697 A1 Aug. 8, 2024

Related U.S. Application Data

(63) Continuation of application No. 18/303,091, filed on Apr. 19, 2023, now Pat. No. 11,978,925.

(60) Provisional application No. 63/337,931, filed on May 3, 2022.

(51) Int. Cl.
H01M 50/574 (2021.01)
H01M 50/262 (2021.01)

(52) U.S. Cl.
CPC ....... H01M 50/574 (2021.01); H01M 50/262 (2021.01)

(58) Field of Classification Search
CPC .... H01M 50/574; H01M 50/262; Y02E 60/10
See application file for complete search history.

(56) References Cited

U.S. PATENT DOCUMENTS 11,978,925 B2   5/2024   Moser et al.
2023/0361437 A1  11/2023  Moser et al.

Primary Examiner — Daniel S Gatewood
(74) Attorney, Agent, or Firm — DUANE MORRIS LLP

(57) ABSTRACT

In some embodiments, a battery safety disconnect system may have a first conductor and a second conductor operatively coupled to at least one battery cell. The battery safety disconnect system may also include a shaft having at least one non-conductive shaft section and at least one conductive shaft section operatively coupled together. The battery safety disconnect system may also include a housing that defines a channel to receive the shaft. The housing may also include a first pole and a second pole. A first conductive contact and a second conductive contact may be configured to facilitate an electrical connection when in contact with the at least one conductive shaft section. Pole fastenings may be configured to attach the poles to the conductors. An operator may be configured to facilitate engagement of the at least one conductive shaft section with the first conductive contact and the second conductive contact.

19 Claims, 10 Drawing Sheets

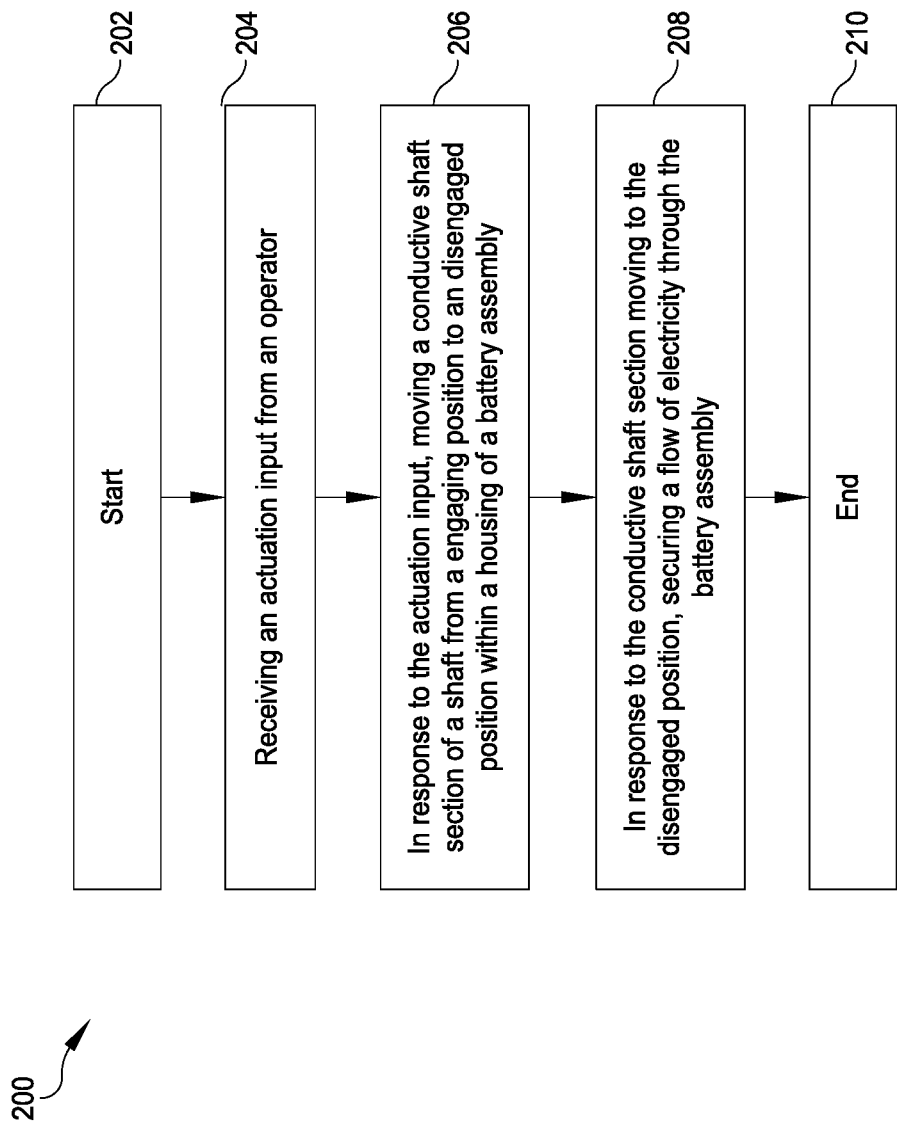

SYSTEM AND METHOD FOR A BATTERY SAFETY DEVICE

CROSS-REFERENCE TO RELATED APPLICATIONS

This application is a continuation of U.S. patent application Ser. No. 18/303,091 filed on Apr. 19, 2023, now U.S. Pat. No. 11,978,925, which claims the benefit of priority under 35 U.S.C. § 119 (e) to prior U.S. Provisional Application No. 63/337,931 filed on May 3, 2022, the disclosures of which are incorporated by reference herein in their entirety.

FIELD OF DISCLOSURE

The present disclosure generally relates to the field of battery assemblies. More specifically, the present disclosure relates to a safety disconnect device for a battery assembly.

BACKGROUND OF THE INVENTION

In order to inspect, test, perform maintenance on, or replace components of a high voltage battery, the voltage of the battery needs to be reduced or secured entirely to ensure the area and battery components are safe to perform any necessary work. Conventionally, the battery assembly may be disabled by removing an external shunt or using knife switches. However, these conventional methods of disabling a battery assembly can increase the cost and complexity of manufacturing and installing a battery assembly. Additionally, the conventional methods of disabling a battery assembly introduce extra mechanical and electrical components to the overall safety system that can increase the weight and reduce the reliability of the safety device.

The present disclosure addresses the aforementioned challenges and problems regarding reducing a battery assembly voltage to the point where it is safe to work on or around it. Embodiments of the present disclosure advantageously allow for a less complex and more reliable compact battery safety device based on a design having one interconnected shaft with a plurality of conductive and non-conductive shaft sections. Thus, the embodiments disclosed herein require only one moving interconnected mechanical part configured to be in electrical connection with the battery thereby reducing the voltage in the battery assembly enclosure when the one interconnected mechanical part is moved out of electrical connection with the battery.

SUMMARY OF THE DISCLOSURE

In some embodiments, a battery safety disconnect system may include at least one battery cell within a battery assembly enclosure. The at least one battery cell may have a first conductor and a second conductor operatively coupled to the at least one battery cell. The battery safety disconnect system may also include a shaft having at least one non-conductive shaft section disposed between a first end and a second end of the at least one non-conductive shaft section. The battery safety disconnect system may also have at least one conductive shaft section disposed between a first end and a second end of the at least one conductive shaft section. The at least one non-conductive shaft section and the at least one conductive shaft section may be operatively coupled together at the second end of the at least one non-conductive shaft section and the first end of the at least one conductive shaft section. The battery safety disconnect system may also include a housing disposed between a first side and a second side of the housing that define a channel. The channel may be configured to receive the shaft therein. The housing may also include a first pole operatively coupled to the first side of the housing and the first conductor. The housing may also include a second pole operatively coupled to the second side of the housing and the second conductor. A first conductive contact may be disposed within the first pole and a second conductive contact may be disposed within the second pole. The first conductive contact and the second conductive contact may be configured to facilitate an electrical connection when in contact with the at least one conductive shaft section. A first pole fastening may be configured to attach the first pole to the first conductor and a second pole fastening may be configured to attach the second pole to the second conductor. An operator may be operatively coupled to the shaft and may be configured to facilitate engagement of the at least one conductive shaft section with the first conductive contact and the second conductive contact.

In some embodiments, a battery safety disconnect system may include at least one battery cell within a battery assembly enclosure. The at least one battery cell may have a first conductor and a second conductor operatively coupled to the at least one battery cell. The battery safety disconnect may also have a chamfered shaft that includes at least one non-conductive shaft section disposed between a first end and a second end of the at least one non-conductive shaft section and at least one conductive shaft section disposed between a first end and a second end of the at least one conductive shaft section. The at least one non-conductive shaft section and the at least one conductive shaft section may be operatively coupled together at the second end of the at least one non-conductive shaft section and the first end of the at least one conductive shaft section. The battery safety disconnect system may also include a housing disposed between a first side and a second side of the housing that define a channel. The channel may be configured to receive the chamfered shaft therein. The housing may include a first pole operatively coupled to the first side of the housing and the first conductor and a second pole operatively coupled to the second side of the housing and the second conductor. A first conductive radial spring may be disposed within the first pole and a second conductive radial spring may be disposed within the second pole. The first conductive radial spring and the second conductive radial spring may be configured to facilitate an electrical connection when in contact with the at least one conductive shaft section. A first pole fastening may be configured to fix the first pole to the first conductor and a second pole fastening may be configured to fix the second pole to the second conductor. The battery safety disconnect system may also include an operator operatively coupled to the chamfered shaft and may be configured to facilitate engagement of the at least one conductive shaft section with the first conductive radial spring and the second conductive radial spring.

BRIEF DESCRIPTION OF THE DRAWINGS

The features and advantages of the present disclosure will be more fully disclosed in, or rendered obvious by, the following detailed descriptions of example embodiments. The detailed descriptions of the example embodiments are to be considered together with the accompanying drawings wherein like numbers refer to like parts and further wherein:

FIG. 8 illustrates a block diagram of a method of disengaging a battery safety disconnect according to some embodiments.

Figure 1:
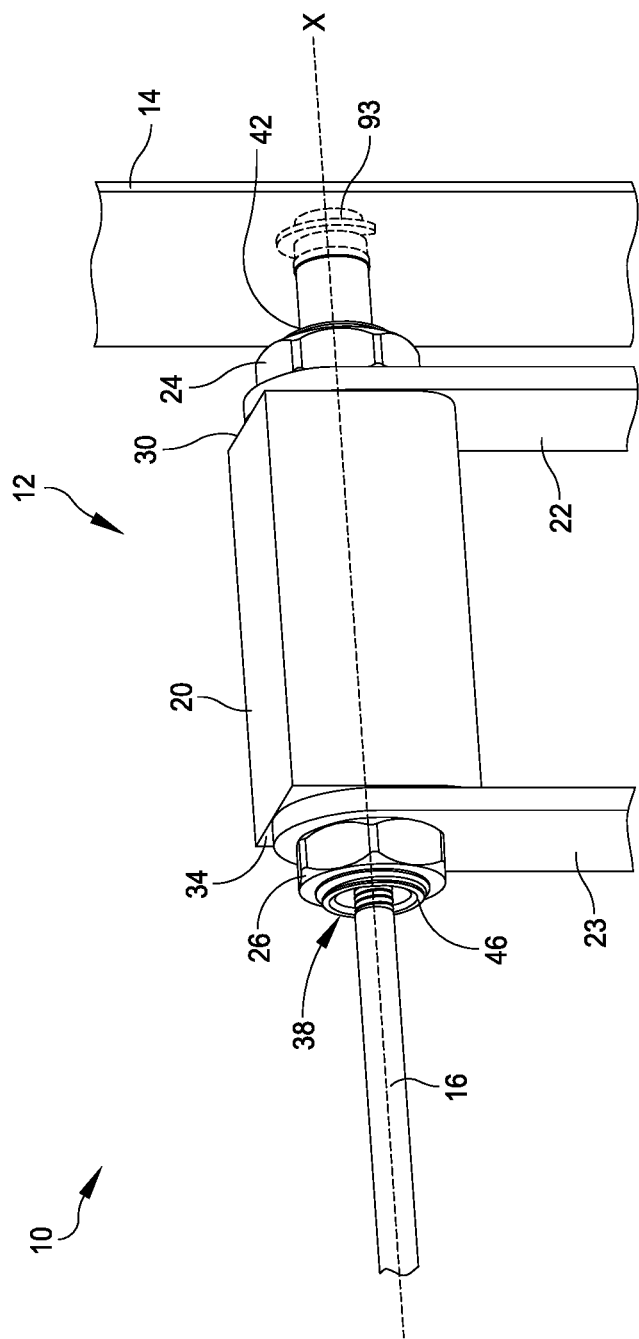
FIG. 1 illustrates a side view of a battery safety disconnect engaged in accordance with some embodiments.
Figure 2:
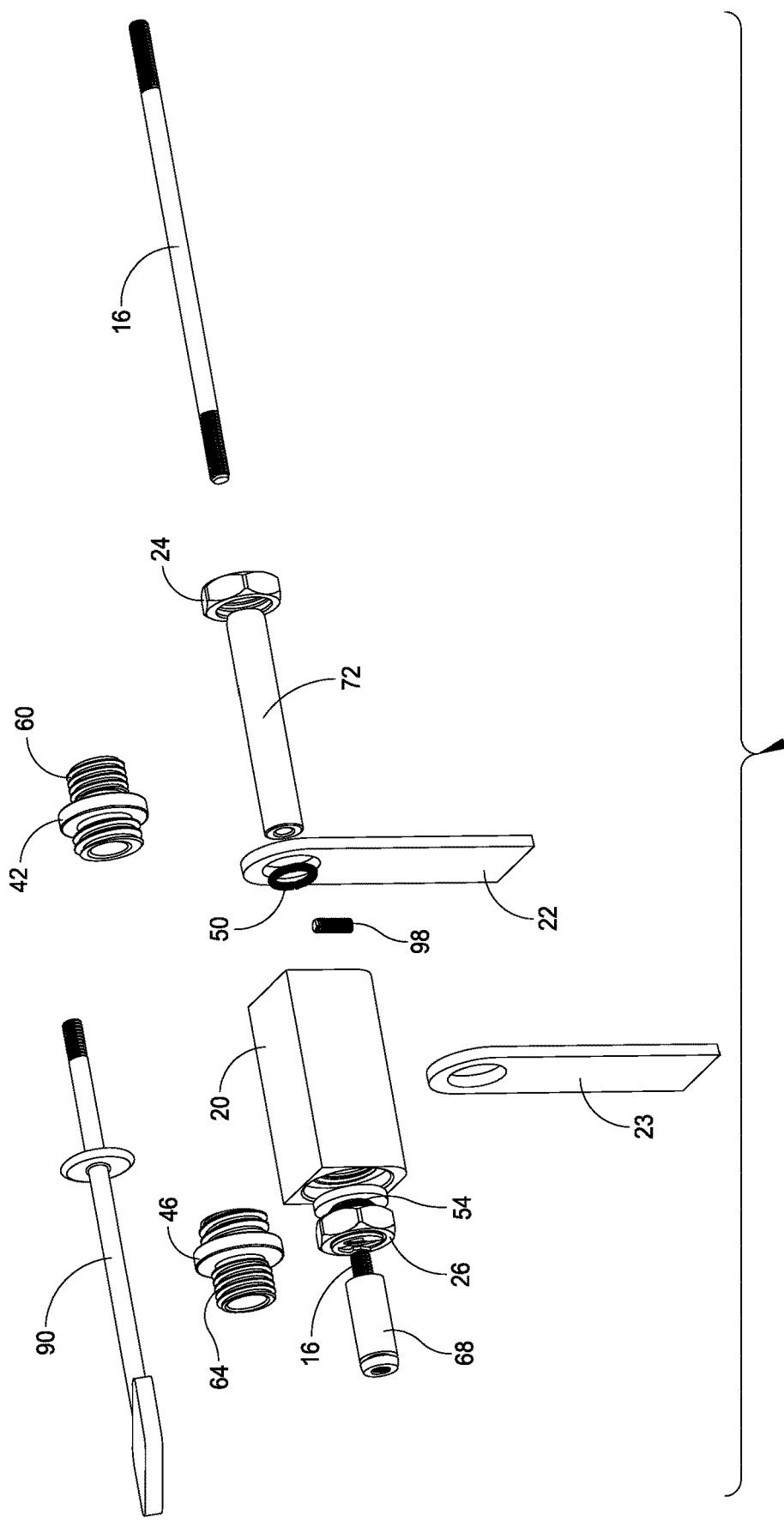
FIG. 2 illustrates an exploded view of a battery safety disconnect in accordance with some embodiments.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

This description of the exemplary embodiments is intended to be read in connection with the accompanying drawings, which are to be considered part of the entire written description. It should be understood, however, that the present disclosure is not intended to be limited to the particular forms disclosed and that the drawings are not necessarily shown to scale. Rather, the present disclosure covers all modifications, equivalents, and alternatives that fall within the spirit and scope of these exemplary embodiments. In the description, relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The terms "couple," "coupled," "operatively coupled," "operatively connected," and the like should be broadly understood to refer to connecting devices or components together either mechanically, or otherwise, such that the connection allows the pertinent devices or components to operate with each other as intended by virtue of that relationship.

The present disclosure is directed to systems and methods for a battery safety disconnect (BSD) system to remove or reduce high voltage in order to make it safe for work in close proximity of the battery assembly. This work could include inspection, cleaning, maintenance (corrective and preventative), battery cell installation and removal, maneuvering, etc. According to the present disclosure, the battery safety disconnect system may be configured for use in an electric vehicle. Specifically, the aircraft may have electric propulsion units (EPUs) for producing thrust, such as the aircraft disclosed in U.S. patent application Ser. No. 17/560,383 filed on Dec. 23, 2021, the disclosure of which is incorporated by reference herein in its entirety. However, the battery safety disconnect could be used in a variety of other battery or electric applications where high voltage is created by combining the elements in series, such as capacitor or fuel cell assemblies.

FIGS. 1-6B illustrate a battery safety disconnect system 10 in accordance with some embodiments. Battery safety disconnect system 10 is configured to operate within a battery assembly enclosure 12, such as a battery well, having at least one battery assembly enclosure wall 14. The battery assembly enclosure 12 houses one or more battery cells operatively coupled together through the battery safety disconnect system, which are configured to power an electric aircraft in some embodiments.

The battery safety disconnect system 10 includes a shaft 16, housing 20, a first conductor 22, a second conductor 23, a first pole fastening 24, and a second pole fastening 26. The first conductor 22 and the second conductor 23 are operatively coupled to a battery cell within the battery assembly enclosure 12 and facilitate the flow of electricity when an electrical circuit is closed. In some embodiments, the first conductor 22 and second conductor 23 can be electrodes, probes, bus bar or any other suitable conductive connector to a battery cell.

The housing 20 is disposed between a first side 30 and a second side 34 of the housing 20. The housing 20 is made of a non-conductive material, such as plastic, glass, rubber, etc. For example, the housing 20 can made of Polyether ether ketone (PEEK) material in order to withstand high temperatures within the housing 20. The first side 30 and the second side 34 of the housing 20 define a channel 38 that is configured to receive the shaft 16. The housing 20 further includes a first pole 42 and a second pole 46 disposed within the channel 38 and configured to receive the shaft 16. The first pole 42 and second pole 46 are made of conductive material, such as a metal or a metal alloy, in order to facilitate the flow of electricity. In some embodiments, the poles 42, 46, pole fastenings 24, 26, and conductors 22, 23 could be combined for each of the respective first and second sides for simplicity instead of having individual parts.

The housing 20 further includes a first conductive contact 50 and a second conductive contact 54 disposed within the first pole 42 and the second pole 46. The first conductive contact 50 and the second conductive contact 54 are configured to engage portions of the shaft 16 to facilitate the flow of electricity between the first conductor 22 and the second conductor 23. In some embodiments, the first conductive contact 50 and the second conductive contact 54 can be radially compressed springs. Radially compressed springs can be useful to engage the shaft 16, keeping the shaft 16 in place. In other embodiments, the first conductive contact 50 and the second conductive contact 54 are spring loaded coincidence contacts (pads/pins).

The first pole 42 and second pole 46 are configured to be coupled to respective first conductor 22 and a respective second conductor 23 with a first pole fastening 24 and a second pole fastening 26. In some embodiments, the first pole fastening 24 and the second pole fastening 26 are threaded nuts that are configured to screw onto a threaded portion 60 of the first pole 42 and a threaded portion 64 of the second pole 46, fixating the first pole 42 and the second pole 46. The first pole fastening 24 and the second pole fastening 26 are further configured to receive shaft 16.

The shaft 16 is configured to move along a longitudinal axis X, and includes at least one non-conductive shaft section 68 operatively coupled to at least one conductive shaft 72 section. The non-conductive shaft section 68 is disposed between a first end 74 and a second end 76 of the non-conductive shaft section 68. The non-conductive shaft section 68 can be made of any suitable non-conductive material. The conductive shaft section 72 is disposed between a first end 78 and a second end 82 of the conductive shaft section 72. In some embodiments, the non-conductive shaft section 68 has a threaded male portion 84 on the second end 76 of the non-conductive shaft section 68 that is sized to fit within a threaded female portion 86 of the first end 78 of the conductive shaft section 72, coupling the non-conductive shaft section 68 and the conductive shaft section 72 together. The shaft 16, including at least one non-conductive shaft section 68 and at least one conductive shaft section 72 operatively coupled together, may be chamfered to allow maneuverability within the channel 38 of the housing 20 and to prevent damage to the first conductive contact 50 and the second conductive contact 54.

The non-conductive shaft 68 further includes an operator 90 adapted to interact with the first end 74 of the non-conductive shaft 68. The operator 90 is configured to move the shaft 16 along longitudinal axis X in response to an actuation input of a pushing or pulling motion. The pushing or pulling motion facilitates the engagement or disengagement of the conductive shaft section 72 with the first conductive contact 50 and the second conductive contact 54. When the conductive shaft section 72 is engaged with the first conductive contact 50 and the second conductive contact 54 the electrical circuit is closed, allowing the flow of electricity. When the conductive shaft section 72 is disengaged from at least the first conductive contact 50 the electrical circuit is open, securing the flow of electricity. In some embodiments, the operator 90 is a key that can be used to lock and unlock the shaft 16, as well as facilitate the actuation input of pushing or pulling the shaft 16. The operator 90 can also be a separate part that is operatively coupled together by a male threaded portion 91 of the operator 90 and a female threaded portion 92 on first end 74 of the non-conductive shaft section 68. In other embodiments, the operator 90 can be an electrical, hydraulic, or pneumatic actuator configured to move the shaft in response to an actuation input from an operation switch. The above examples of the operator 90 are not limiting, other electrical or digital means of operating the battery safety disconnect system 10 to move the shaft 16 could be employed.

In some embodiments, the non-conductive shaft section 68 includes a restraining device 93 disposed towards the first end 74 of the non-conductive shaft section 68, such as a retaining ring, to limit the movement of the shaft 16 within battery assembly enclosure 12. The restraining device 93 can be disposed towards the first end 74 of the non-conductive shaft section 68 either within the battery assembly enclosure 12, outside of it, or both. As an example, if the shaft 16 was pulled towards the battery assembly enclosure wall 14, a restraining device 93 on the inside of the battery assembly enclosure 12 would prevent the shaft 16 from being pulled completely out of the housing 20 and keep the shaft 16 disposed within channel 38. In some embodiments, the operator 90 itself can include a preventive device 94 disposed on the operator 90 that is configured to prevent the shaft 16 from being pushed into the battery assembly enclosure 12, functioning similar to a restraining device 93 outside of the battery assembly enclosure 12.

The conductive shaft section 72 may further include an aperture 95 on a bottom section of the conductive shaft section 72. The aperture 95 is sized and configured to receive a pin 98 disposed within the channel 38 of the housing 20. The pin 98 is adapted to limit the movement of the conductive shaft section 72 within the housing 20 when the shaft 16 is moved along the longitudinal axis X. In some embodiments, the pin 98 is a threaded set screw that can be unscrewed from the housing 20 to facilitate the removal of the shaft 16 from the battery safety disconnect system 10 if needed.

As described above, the battery safety disconnect system 10 can be configured to move the shaft 16 from a first positon (engaged position) to a second position (disengaged positon). The ability to move the shaft 16 from the engaged position to disengaged position facilitates the ability to remove a high voltage connection inside the battery assembly enclosure 12 when the conductive shaft section 72 is disengaged from the first conductive contact 50 and the second conductive contact 54. For example, the battery safety disconnect system 10 can be used to quickly and efficiently reduce the voltage to ensure that someone is not exposed to unsafe voltage within the battery assembly enclosure 12.

Figure 3:
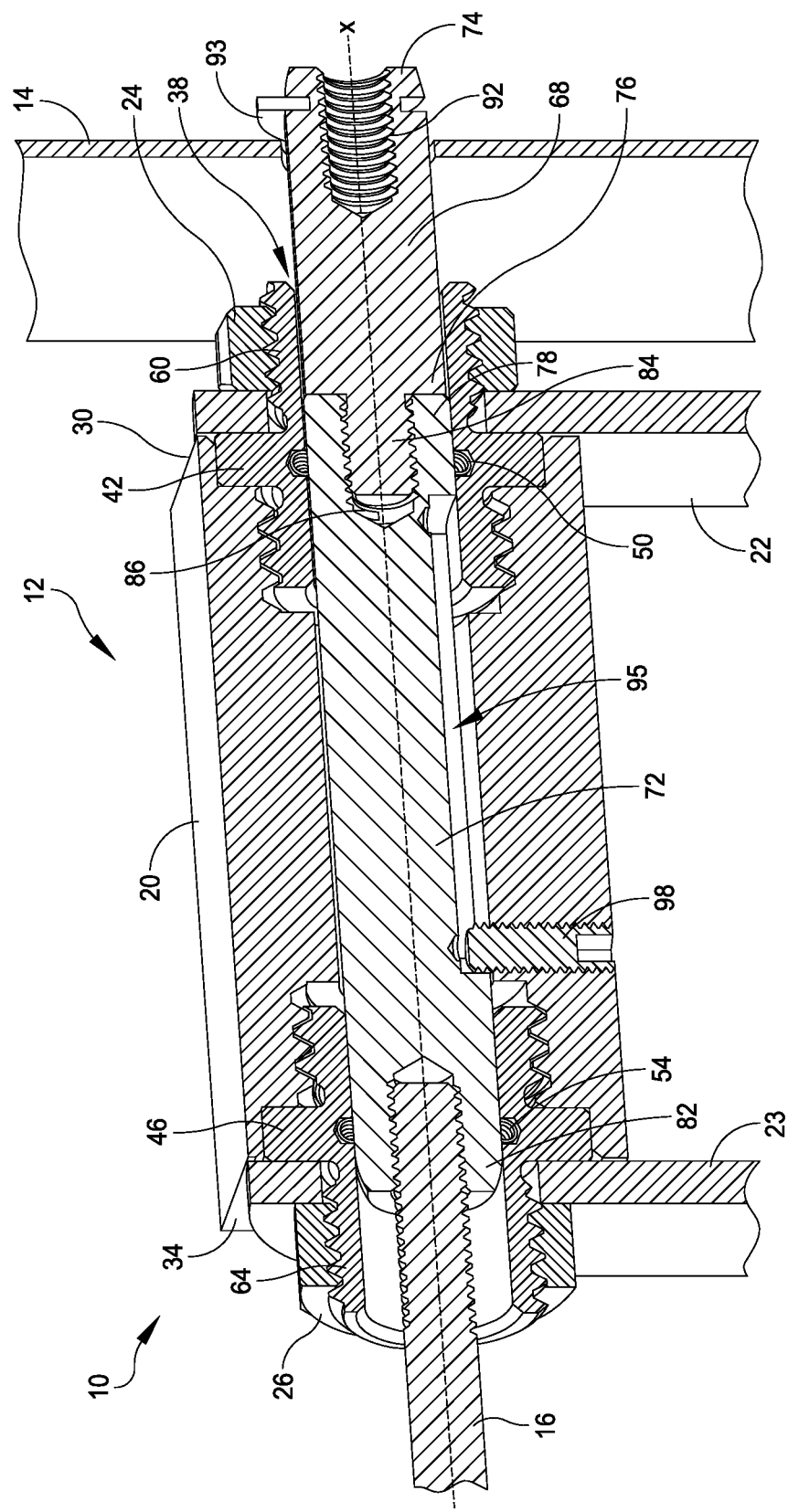
FIG. 3 illustrates a cross sectional view of a battery safety disconnect engaged in accordance with some embodiments.
Figure 4:
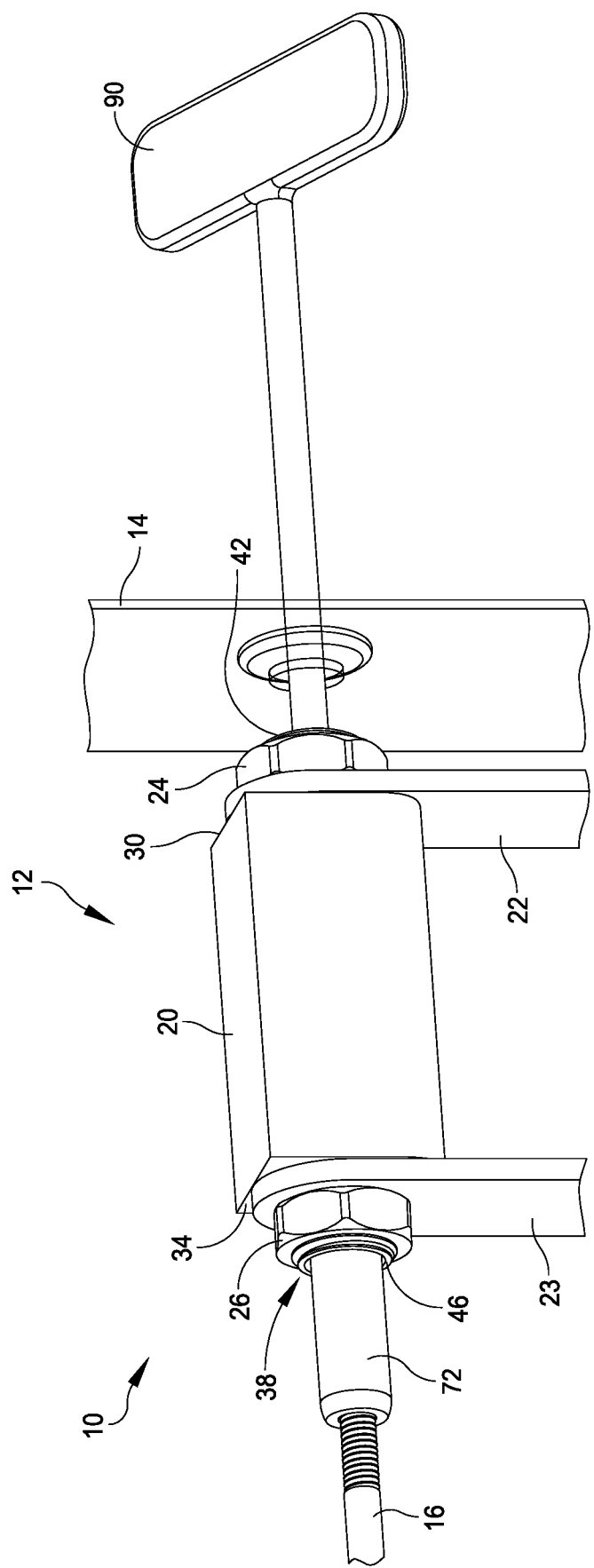
FIG. 4 illustrates a side view of a battery safety disconnect disengaged in accordance with some embodiments.

As mentioned above, the shaft 16 can be moved along the longitudinal axis X between a first position (engaged position) and a second position (disengaged position), in response to an actuation input from the operator 90. These two engaged and disengaged states refer to the status of the conductive shaft section 72 within the channel 38. As illustrated in FIG. 3, the conductive shaft section 72 is in the first position (engaged position). In this first position, the conductive shaft section 72 is in contact with both the first conductive contact 50 and the second conductive contact 54 completing the circuit for the battery and allowing for the flow of electricity.

Figure 5:
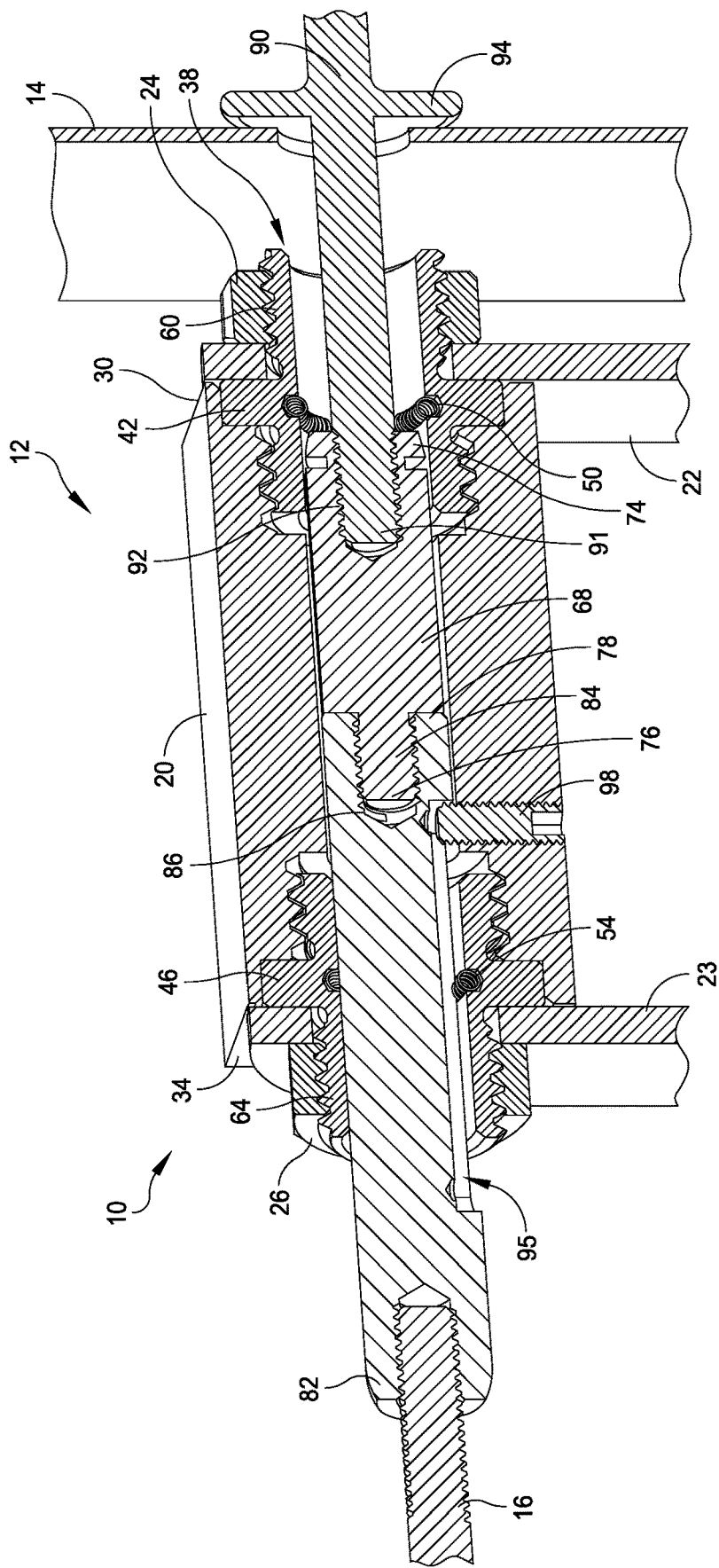
FIG. 5 illustrates a cross sectional view of a battery safety disconnect disengaged in accordance with some embodiments.
Figure 6A:
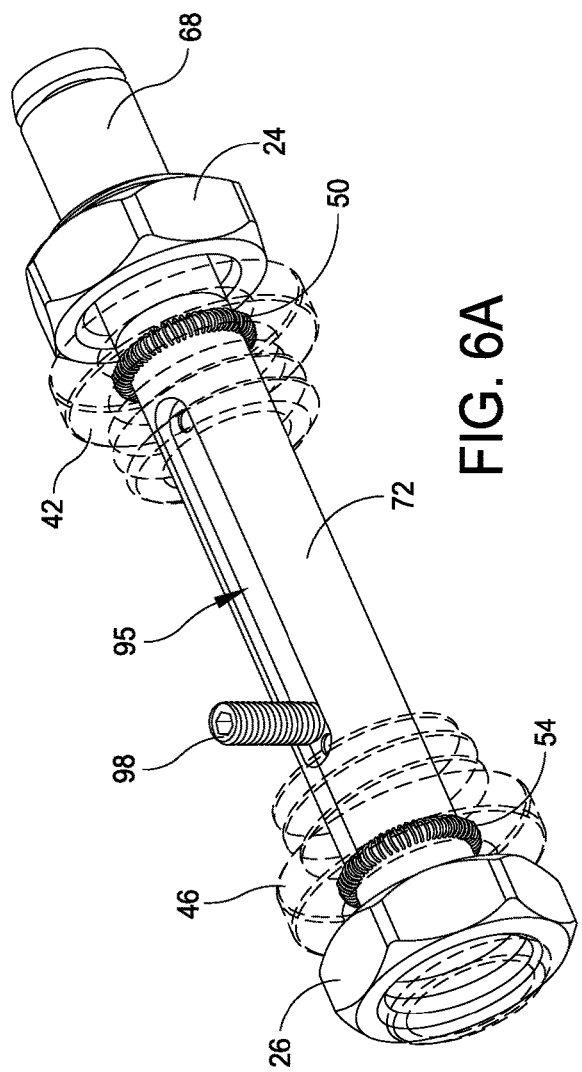
FIG. 6A illustrates a side view of a pin travel limit in accordance with some embodiments.
Figure 6B:
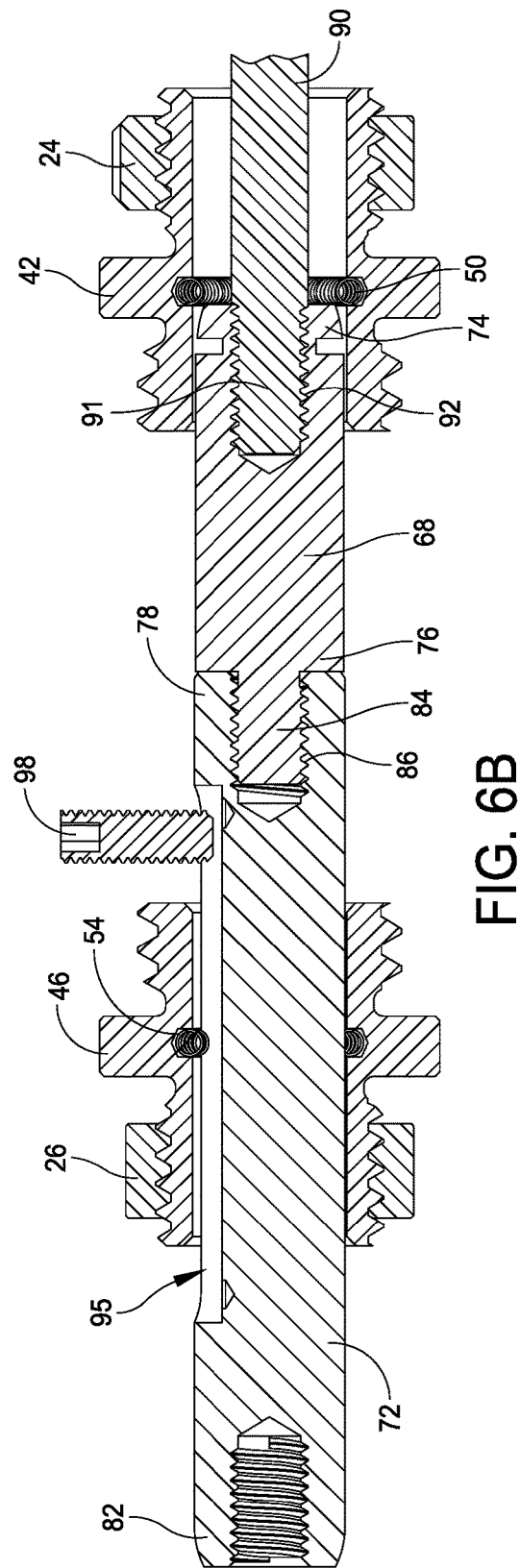
FIG. 6B illustrates a cross sectional view of a pin travel limit in accordance with some embodiments.

If the battery cell needs to be disconnected, then the operator 90 can be used to push the shaft 16 along the longitudinal axis X to the second position (disengaged position). As illustrated in FIG. 5, once the shaft 16 is pushed into the disengaged position, the conductive shaft section 72 is disengaged from at least the first conductive contact 50, cutting off the flow of electricity. In some embodiments, the pin 98 prevents the conductive shaft section 72 from being pushed out of the channel 38 entirely. To re-establish the flow of electricity, the operator 90 can be operated to pull the shaft 16 so that the conductive shaft section 72 is moved back into the first position engaging the first conductive contact 50, closing the circuit. In some embodiments, the restraining device 93 prevents the shaft 16 from being pulled out of the housing 10 and battery assembly enclosure 12.

Figure 7A:
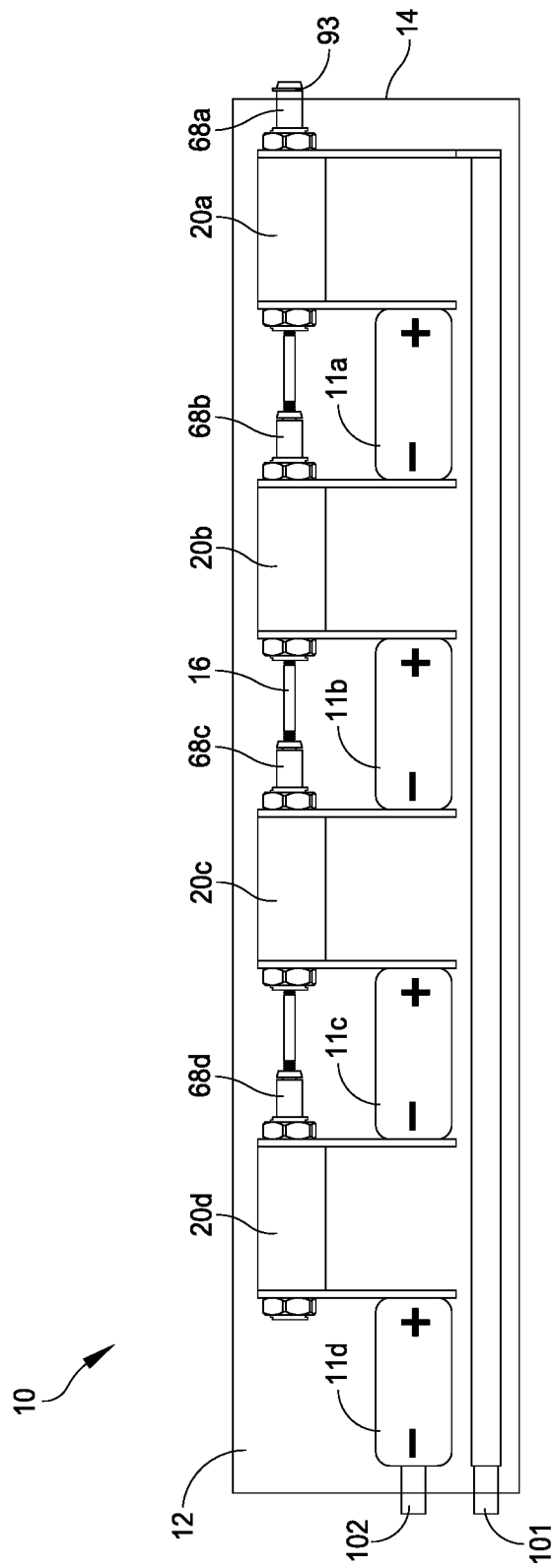
FIG. 7A illustrates a side view of a battery assembly connected in series with the battery safety device engaged in accordance with some embodiments.
Figure 7B:
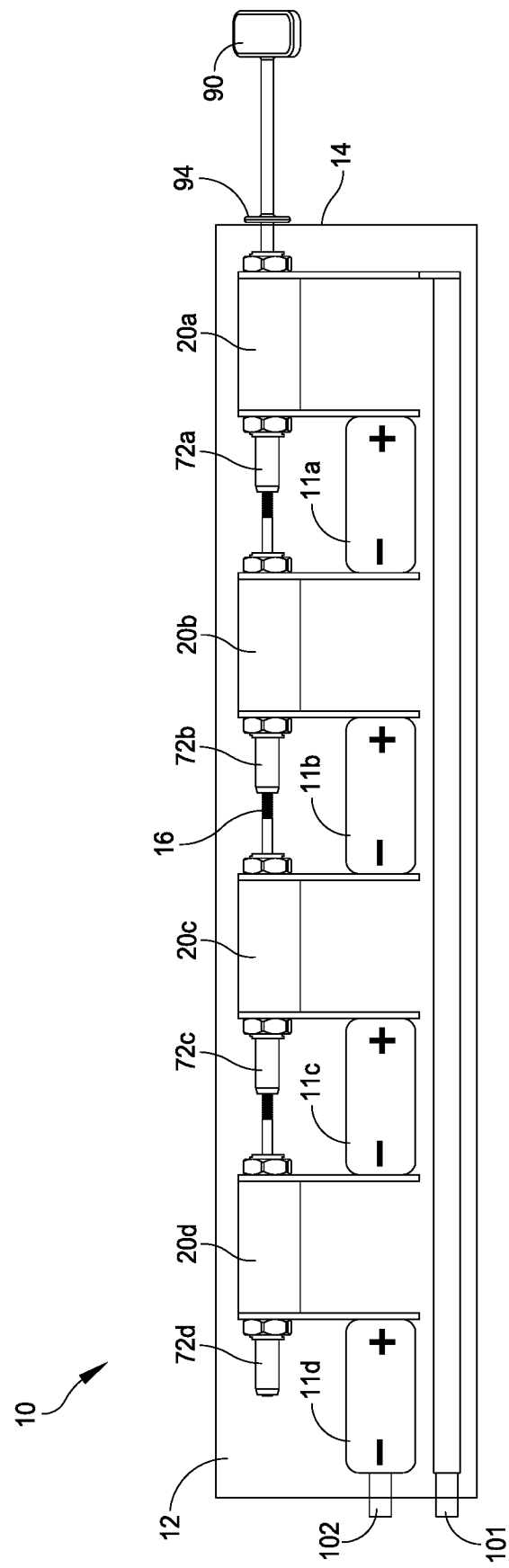
FIG. 7B illustrates a side view of a battery assembly connected in series with the battery safety device disengaged in accordance with some embodiments.

Referring now to FIGS. 7A-7B, the battery safety disconnect system 10 has been discussed above with reference to one battery cell. However, as illustrated in FIGS. 7A and 7B, the battery safety disconnect system 10 can be adapted to connect a plurality of battery cells, such as battery cells 11a-d, through a plurality of interconnected non-conductive shaft sections 68a-d and a plurality of conductive shaft sections 72a-d all operatively coupled together as discussed above. Consequently, the battery safety disconnect system 10 would comprise a plurality of housings 20a-d each with their respective components as described above with reference to FIGS. 1-5. For example, each housing 20a-d would comprise its own respective first conductive contact 50 and second conductive contact 54 within housing 20a, 20b, 20c, or 20d.

FIG. 7A illustrates the battery safety disconnect system 10 in the first, or engaged, position-the conductive shaft sections 72a-d are all disposed within housings 20a-d and engaged with first conductive contacts 50 and second conductive contacts 54 closing the circuit and allowing the flow of electricity between points 101 and 102. Conversely, FIG. 7B illustrates the battery safety disconnect system 10 in the second, or disengaged, position-the operator 90 was actuated, pushing the shaft 16 so that the conductive shaft sections 72a-d are disengaged from at the least the first conductive contacts 50 within the housings 20a-d. Once the conductive shaft sections 72a-d are disengaged from at least the first conductive contacts 50, the circuit is open between points 101 and 102.

FIG. 8 illustrates a block diagram of a method 200 of disengaging a battery safety disconnect system 10 according to some embodiments. The method 200 starts at step 202. The method 200 then continues to step 204, which includes receiving an actuation input from an operator 90. The method 200 then continues to step 206, which includes in response to the actuation input, moving a conductive shaft section 72 of a shaft 16 from an engaged position to a disengaged position within a housing 20 of a battery assembly. The method 200 then continues to step 208, which includes in response to the conductive shaft section 72 moving to the disengaged position, securing a flow of electricity through the battery assembly. The method 200 then ends at step 210.

Figure 9:
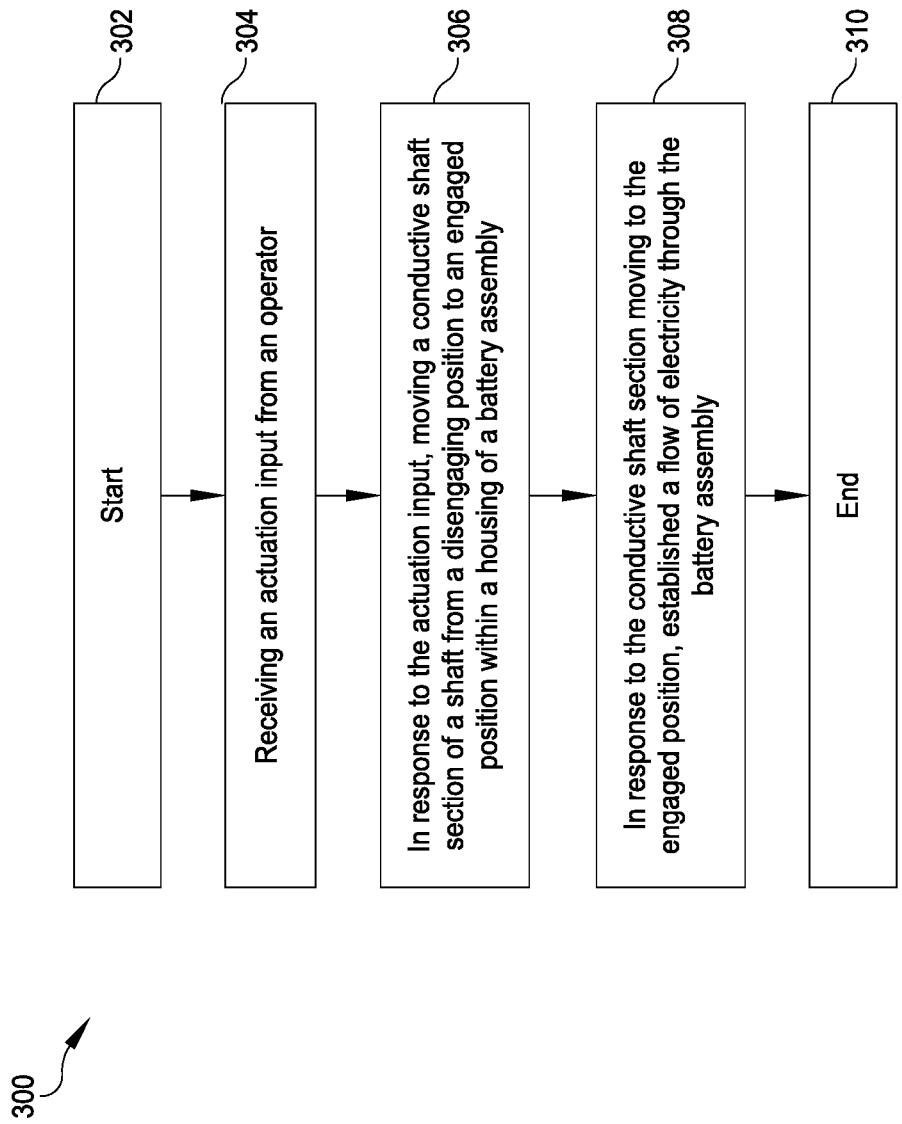
FIG. 9 illustrates a block diagram of a method of engaging a battery safety disconnect according to some embodiments.

FIG. 9 illustrates a block diagram of a method 300 of engaging a battery safety disconnect system 10 according to some embodiments. The method 300 starts at step 302. The method 300 then continues to step 304, which includes receiving an actuation input from an operator 90. The method 300 then continues to step 306, which includes in response to the actuation input, moving a conductive shaft section 72 of a shaft 16 from a disengaged position to an engaged position within a housing 20 of a battery assembly. The method 300 then continues to step 308, which includes in response to the conductive shaft section 72 moving to the engaged position, establishing a flow of electricity through the battery assembly. The method 300 then ends at step 310.

In some embodiments, a battery safety disconnect system may include at least one battery cell within a battery assembly enclosure. The at least one battery cell may have a first conductor and a second conductor operatively coupled to the at least one battery cell. The battery safety disconnect system may also include a shaft having at least one non-conductive shaft section disposed between a first end and a second end of the at least one non-conductive shaft section. The battery safety disconnect system may also have at least one conductive shaft section disposed between a first end and a second end of the at least one conductive shaft section. The at least one non-conductive shaft section and the at least one conductive shaft section may be operatively coupled together at the second end of the at least one non-conductive shaft section and the first end of the at least one conductive shaft section. The battery safety disconnect system may also include a housing disposed between a first side and a second side of the housing that define a channel. The channel may be configured to receive the shaft therein. The housing may also include a first pole operatively coupled to the first side of the housing and the first conductor. The housing may also include a second pole operatively coupled to the second side of the housing and the second conductor. A first conductive contact may be disposed within the first pole and a second conductive contact may be disposed within the second pole. The first conductive contact and the second conductive contact may be configured to facilitate an electrical connection when in contact with the at least one conductive shaft section. A first pole fastening may be configured to attach the first pole to the first conductor and a second pole fastening may be configured to attach the second pole to the second conductor. An operator may be operatively coupled to the shaft and may be configured to facilitate engagement of the at least one conductive shaft section with the first conductive contact and the second conductive contact.

In some embodiments, the first end of the at least one non-conductive shaft section may include a restraining device configured to limit motion of the shaft within the battery assembly enclosure.

In some embodiments, when the shaft is in a first position the at least one conductive shaft section may engage the first conductive contact and the second conductive contact.

In some embodiments, when the shaft is in a second position the at least one conductive shaft section may disengage from at least the first conductive contact.

In some embodiments, the shaft may be chamfered.

In some embodiments, the first conductive contact and the second conductive contact may be radial springs.

In some embodiments, the first conductive contact and the second conductive contact may be spring loaded coincidence contacts.

In some embodiments, the at least one conductive shaft section has an aperture on a bottom section of the at least one conductive shaft section that is configured to receive a pin operatively coupled to the housing to limit a movement of the at least one conductive shaft section within the channel of the housing.

In some embodiments, the pin may be a set screw.

In some embodiments, the operator may be a key.

In some embodiments, the operator may be an actuator that moves the shaft between a first position and a second position based at least in part on an actuation input from an operation switch.

In some embodiments, the first end of the at least one conductive shaft section may include a threaded female portion configured to receive a threaded male portion disposed on the second end of the at least one non-conductive shaft section.

In some embodiments, a battery safety disconnect system may include at least one battery cell within a battery assembly enclosure. The at least one battery cell may have a first conductor and a second conductor operatively coupled to the at least one battery cell. The battery safety disconnect may also have a chamfered shaft that includes at least one non-conductive shaft section disposed between a first end and a second end of the at least one non-conductive shaft section and at least one conductive shaft section disposed between a first end and a second end of the at least one conductive shaft section. The at least one non-conductive shaft section and the at least one conductive shaft section may be operatively coupled together at the second end of the at least one non-conductive shaft section and the first end of the at least one conductive shaft section. The battery safety disconnect system may also include a housing disposed between a first side and a second side of the housing that define a channel. The channel may be configured to receive the chamfered shaft therein. The housing may include a first pole operatively coupled to the first side of the housing and the first conductor and a second pole operatively coupled to the second side of the housing and the second conductor. A first conductive radial spring may be disposed within the first pole and a second conductive radial spring may be disposed within the second pole. The first conductive radial spring and the second conductive radial spring may be configured to facilitate an electrical connection when in contact with the at least one conductive shaft section. A first pole fastening may be configured to fix the first pole to the first conductor and a second pole fastening may be configured to fix the second pole to the second conductor. The battery safety disconnect system may also include an operator operatively coupled to the chamfered shaft and may be configured to facilitate engagement of the at least one conductive shaft section with the first conductive radial spring and the second conductive radial spring.

In some embodiments, the first end of the at least one non-conductive shaft section may include a restraining device configured to limit motion of the chamfered shaft within the battery assembly enclosure.

In some embodiments, when the chamfered shaft is in a first position the at least one conductive shaft section may engage the first conductive radial spring and the second conductive radial spring.

In some embodiments, when the chamfered shaft is in a second position the at least one conductive shaft section may disengage from at least the first conductive radial spring.

In some embodiments, the at least one conductive shaft section may have an aperture on a bottom section of the at least one conductive shaft section that is configured to receive a pin operatively coupled to the housing to limit a movement of the at least one conductive shaft section within the channel of the housing.

In some embodiments, the pin may be a set screw.

In some embodiments, the operator may be a key.

In some embodiments, the operator may be an actuator that moves the chamfered shaft between a first position and a second position based at least in part on an actuation input from an operation switch.

The foregoing is provided for purposes of illustrating, explaining, and describing embodiments of these disclosures. Modifications and adaptations to these embodiments will be apparent to those skilled in the art and may be made without departing from the scope or spirit of these disclosures.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

While this specification contains many specifics, these should not be construed as limitations on the scope of any disclosures, but rather as descriptions of features that may be specific to particular embodiment. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A system comprising:
    at least one battery cell, wherein the at least one battery cell has a first conductor and a second conductor each operatively coupled to the at least one battery cell;
    a shaft comprising at least one non-conductive shaft section and at least one conductive shaft section operatively coupled together;
    a housing defining a channel and configured to receive the shaft therein, the housing further comprising:
        a first pole operatively coupled to the housing and the first conductor, and a second pole operatively coupled to the housing and the second conductor; and
        a first conductive contact disposed within the first pole and a second conductive contact disposed within the second pole, wherein the first conductive contact and the second conductive contact are configured to facilitate an electrical connection when in contact with the at least one conductive shaft section.

2. The system of claim 1, wherein the at least one non-conductive shaft section further includes a restraining device configured to limit motion of the shaft.

3. The system of claim 1, wherein when the shaft is in a first position the at least one conductive shaft section engages the first conductive contact and the second conductive contact.

4. The system of claim 1, wherein when the shaft is in a second position the at least one conductive shaft section disengages from at least the first conductive contact.

5. The system of claim 1, wherein the shaft is chamfered.

6. The system of claim 1, wherein the first conductive contact and the second conductive contact are radial springs.

7. The system of claim 1, wherein the first conductive contact and the second conductive contact are spring loaded coincidence contacts.

8. The system of claim 1, wherein the at least one conductive shaft section has an aperture on a bottom section of the at least one conductive shaft section that is configured to receive a pin to limit a movement of the at least one conductive shaft section within the channel of the housing.

9. The system of claim 8, wherein the pin is a set screw.

10. The system of claim 1, further comprising an operator operatively coupled to the shaft and configured to facilitate engagement of the at least one conductive shaft section with the first conductive contact and the second conductive contact.

11. The system of claim 10, wherein the operator is an actuator that moves the shaft between a first position and a second position based at least in part on an actuation input from an operation switch.

12. The system of claim 1, wherein the at least one conductive shaft section includes a threaded female portion configured to receive a threaded male portion disposed on the at least one non-conductive shaft section.

13. A battery safety disconnect system comprising:
   at least one battery cell within a battery assembly enclosure, wherein the at least one battery cell has a first conductor and a second conductor each operatively coupled to the at least one battery cell;
   a shaft comprising at least one non-conductive shaft section and at least one conductive shaft section operatively coupled together;
   a housing that defines a channel and configured to receive the shaft therein, the housing further comprising:
      a first pole operatively coupled to the housing and the first conductor, and a second pole operatively coupled to the housing and the second conductor; and
      a first conductive contact disposed within the first pole and a second conductive contact disposed within the second pole, wherein the first conductive contact and the second conductive contact are configured to facilitate an electrical connection when in contact with the at least one conductive shaft section; and
   an operator operatively coupled to the shaft and configured to facilitate engagement of the at least one conductive shaft section with the first conductive contact and the second conductive contact.

14. The battery safety disconnect system of claim 13, wherein the at least one non-conductive shaft section further includes a restraining device configured to limit motion of the shaft within the battery assembly enclosure.

15. The battery safety disconnect system of claim 13, wherein when the shaft is in a first position the at least one conductive shaft section engages the first conductive contact and the second conductive contact.

16. The battery safety disconnect system of claim 13, wherein when the shaft is in a second position the at least one conductive shaft section disengages from at least the first conductive contact.

17. The battery safety disconnect system of claim 13, wherein the at least one conductive shaft section has an aperture on a bottom section of the at least one conductive shaft section that is configured to receive a pin to limit a movement of the at least one conductive shaft section within the channel of the housing.

18. The battery safety disconnect system of claim 17, wherein the pin is a set screw.

19. The battery safety disconnect system of claim 13, wherein the operator is an actuator that moves the shaft between a first position and a second position based at least in part on an actuation input from an operation switch.

* * * * *